United States Patent
Saito et al.

(10) Patent No.: US 7,761,214 B2
(45) Date of Patent: Jul. 20, 2010

(54) VEHICLE DECELERATION CONTROL DEVICE

(75) Inventors: Shigeru Saito, Kariya (JP); Koichi Kokubo, Nagoya (JP); Masahiro Matsuura, Chiryu (JP); Yuji Sengoku, Aichi-gun (JP)

(73) Assignee: Advics Co., Ltd., Aichi-pref. (JP)

( * ) Notice: Subject to any disclaimer, the term of this patent is extended or adjusted under 35 U.S.C. 154(b) by 874 days.

(21) Appl. No.: 11/593,633

(22) Filed: Nov. 7, 2006

(65) Prior Publication Data

US 2008/0009996 A1      Jan. 10, 2008

(30) Foreign Application Priority Data

Nov. 9, 2005     (JP) .............................. 2005-324806

(51) Int. Cl.
    *B60L 7/10*     (2006.01)
(52) U.S. Cl. ..................................... 701/70; 180/65.27
(58) Field of Classification Search .................. None
    See application file for complete search history.

(56) References Cited

U.S. PATENT DOCUMENTS

| 4,146,108 A * | 3/1979 | Sato ........................... 180/271 |
| 6,554,744 B2 * | 4/2003 | Schmidt ..................... 477/208 |
| 2001/0004028 A1 | 6/2001 | Sato et al. |
| 2001/0037171 A1 * | 11/2001 | Sato ............................... 701/70 |
| 2002/0107629 A1 | 8/2002 | Maruko et al. |
| 2003/0045394 A1 * | 3/2003 | Kurabayashi ................. 477/44 |
| 2004/0099085 A1 * | 5/2004 | Olofsson ...................... 74/513 |
| 2007/0102208 A1 * | 5/2007 | Okuda et al. ............... 180/65.3 |

FOREIGN PATENT DOCUMENTS

| JP | 05-042861 A | 2/1993 |
| JP | 2001-88587 | * 4/2001 |
| JP | 2001-310714 A | 11/2001 |
| JP | 2001-315633 A | 11/2001 |
| JP | A-2001-322540 | 11/2001 |

OTHER PUBLICATIONS

Office Action issued from the Japanese Patent Office on May 25, 2010 for the corresponding Japanese patent application No. 2005-324806 (a copy and English translation enclosed herewith).

* cited by examiner

*Primary Examiner*—Michael J. Zanelli
(74) *Attorney, Agent, or Firm*—Posz Law Group, PLC

(57) ABSTRACT

A vehicle deceleration control device is provided that can determine an appropriate supplemental braking force when a braking force is applied according to an accelerator operation state. An engine braking-equivalent braking force is varied according to an initial accelerator angle when an accelerator returns and according to an accelerator return speed. That is, the greater the initial accelerator angle is, or the greater the accelerator return speed is, the greater the value to which the engine braking-equivalent braking force is set. It therefore becomes possible to determine the appropriate supplemental braking force that reflects the driver's braking intention.

10 Claims, 8 Drawing Sheets

VEHICLE DECELERATION CONTROL DEVICE

CROSS REFERENCE TO RELATED APPLICATION

This application is based on and incorporates herein by reference Japanese patent application No. 2005-324806 filed on Nov. 9, 2005.

FIELD OF THE INVENTION

The present invention relates to a vehicle deceleration control device for setting a supplemental braking force for a vehicle based on a state of operation performed to an accelerator by a driver.

BACKGROUND OF THE INVENTION

In Japanese Patent Publication No. 2001-322540, a vehicle deceleration control device is proposed which generates deceleration in a vehicle by applying a supplemental braking force according to an operational state of an accelerator (for example, according to whether an accelerator pedal is released). When an output level of the accelerator decreases to a predetermined value, that is, the output level falls within a no-load operation range in which output power of an engine decreases to its minimum or the engine stops, the device generates the supplemental braking force by means of regenerative braking or the like, achieving a deceleration equivalent to that achieved by engine braking.

Although the achievement of the deceleration is described in the patent document cited above, no detailed disclosure is given regarding a method for determining the supplemental braking force to be applied to the vehicle.

SUMMARY OF THE INVENTION

It is therefore an object of the present invention to provide a vehicle deceleration control device that determines an appropriate supplemental braking force according to a state of operation of an accelerator when a braking force is applied.

According to an aspect of the present invention, a first detection portion detects a state of operation performed to an accelerator by a driver when an accelerator pedal returns, a setting portion sets a braking force based on the determined state of the operation, and a control portion generates the braking force which is set by the setting portion.

If the braking force is determined based on the state of the operation when the accelerator pedal returns, it is possible to determine the braking force (i.e. a supplemental braking force) so that it reflects driver's intention in the operation. Therefore, it is possible to determine the appropriate supplemental braking force according to the driver's braking intention and to improve feeling of the regenerative braking that is imparted to the driver.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

First Embodiment

A first embodiment of the present invention will be explained with reference to FIGS. 1 and 2.

The vehicle deceleration control device is installed in a hybrid vehicle. Although FIG. 1 shows a system configuration of the device in installed in a front wheel drive hybrid vehicle, it is apparent that the device can also be installed in a rear wheel drive hybrid vehicle or a four wheel drive hybrid vehicle.

Figure 1:
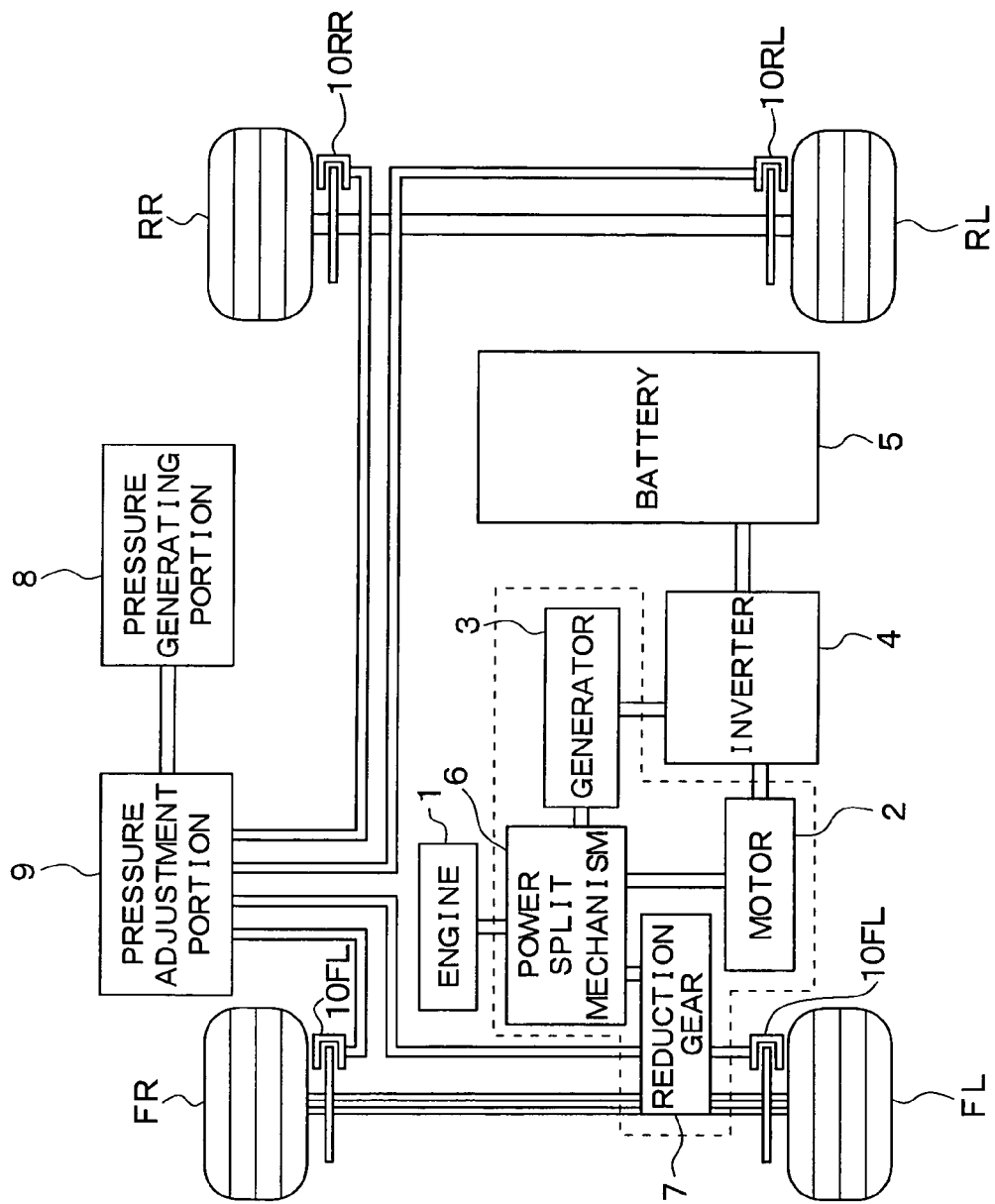
FIG. 1 is a system configuration diagram of a drive system and a brake system in a vehicle in which a vehicle deceleration control device according to a first embodiment of the present invention is installed.

As shown in FIG. 1, the hybrid vehicle is provided with an engine 1 and a motor 2, which serve as sources of drive power, as well as a generator 3, which serves as an electric generator. The motor 2 and the generator 3 are configured as alternating current synchronous types and are electrically connected with an inverter 4. The inverter 4 is electrically connected with a battery 5, transmits excess power for charging to the battery 5, and transmits electrical power for supplying from the battery 5.

The engine 1, the motor 2, and the generator 3 are connected with each other through a power split mechanism 6, which includes a planetary gear mechanism. The power split mechanism 6 transmits a driving force to a reduction gear 7, which has a differential function, and the reduction gear 7 in turn transmits the driving force to front wheels FR, FL. The drive system of the vehicle in which the vehicle deceleration control device is installed is configured in this manner.

The vehicle deceleration control device is provided with a brake system that includes a brake hydraulic pressure generating portion 8 and a brake hydraulic pressure adjustment portion 9, as well as braking force generating portions 10FL, 10FR, 10RL, and 10RR, which are respectively provided on wheels FL, FR, RL, and RR.

The pressure generating portion 8 includes an electric motor, an accumulator, and the like and generates brake hydraulic pressure based on an operation performed to a brake pedal (not shown).

The pressure adjustment portion 9 adjusts the brake hydraulic pressure that is generated by the pressure generating portion 8 and may, for example, include a brake hydraulic pressure control actuator that has various types of control valves and the like. In this case, the pressure adjustment portion 9 controls, by driving the various types of control valves, a configuration of a path through which the brake hydraulic pressure is transmitted. The pressure adjustment portion 9 also increases, decreases, and maintains the brake hydraulic pressure that is transmitted to the braking force generating portions 10FL 10FR, 10RL, and 10RR.

The braking force generating portions 10FL 10FR, 10RL, and 10RR generate friction forces based on the brake hydraulic pressure received from the pressure adjustment portion 9, thereby generating braking forces on the wheels FL FR, RL, and RR. Here, the braking force generating portions 10FL 10FR, 10RL, and 10RR include disk brakes having calipers and disk rotors. When the brake hydraulic pressure is transmitted from the pressure adjustment portion 9 to wheel cylinders in the calipers, brake pads that are provided on the calipers are pressed against the disk rotors, thereby generating friction forces.

Figure 2:
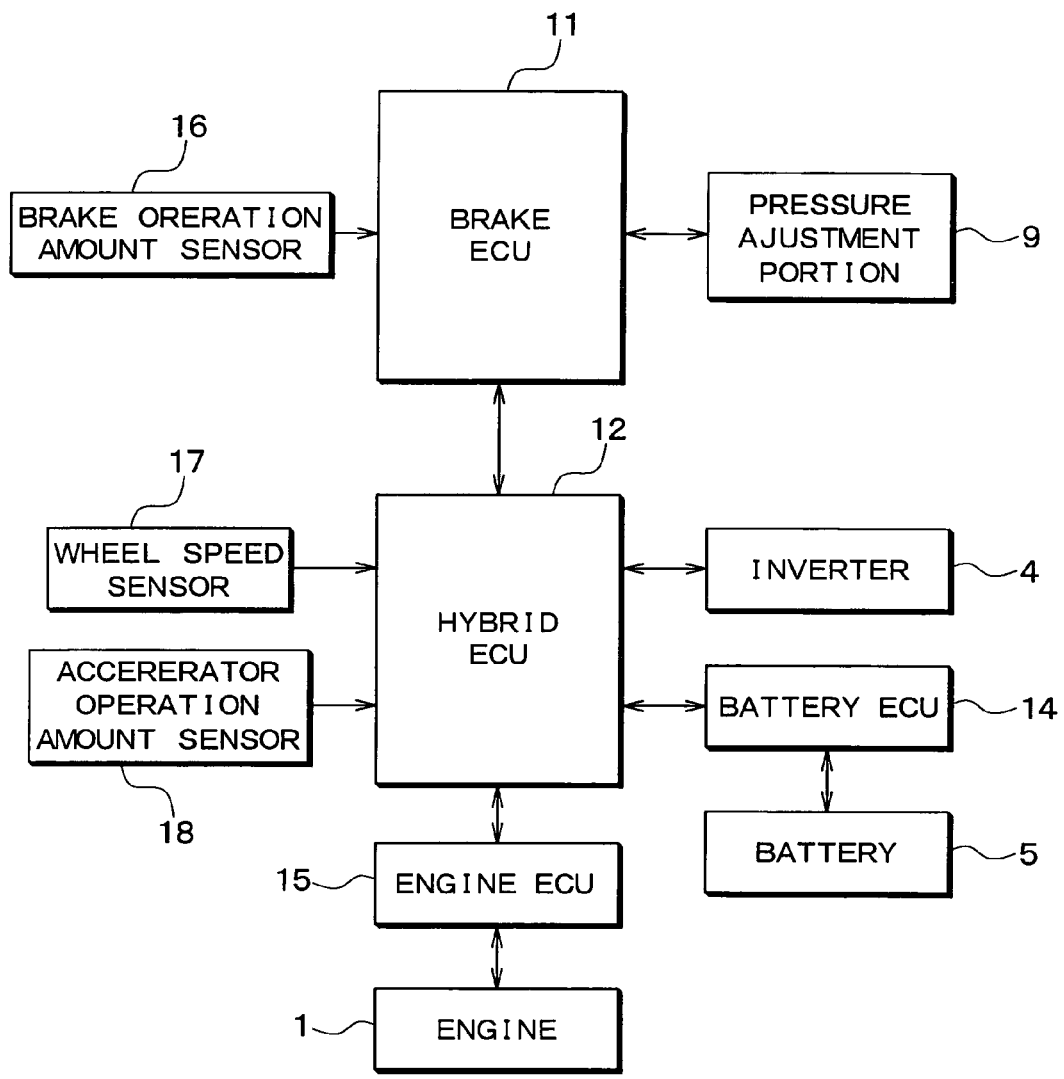
FIG. 2 is a block diagram of a control system for the vehicle deceleration control device.

As shown in FIG. 2, a control system of the vehicle deceleration control device includes a brake ECU 11, a hybrid ECU 12, a battery ECU 14, and an engine ECU 15. All of the ECUs are connected via the hybrid ECU 12, and data in each ECU, such as calculation results and the like, can be transmitted to other ECUs via the hybrid ECU 12.

The brake ECU 11 controls the pressure adjustment portion 9. The brake ECU 11 receives detection signals from a brake operation amount sensor 16 (for example, a pedaling force sensor or a stroke sensor), which is installed to the brake pedal, receives various types of information that are handled by the hybrid ECU 12, and controls the brake hydraulic pressure adjustment portion 9.

The hybrid ECU 12 controls the drive system in its mandatory operation. The hybrid ECU 12 receives detection signals from a wheel speed sensor 17 for detecting a wheel speed, and determines a vehicle speed based on the wheel speed. The hybrid ECU 12 also receives output signals from an accelerator operation amount sensor 18 installed to the accelerator pedal, and determines an amount (hereinafter referred to an accelerator operation amount) of the operation performed to the accelerator. The hybrid ECU 12 then stores in a memory the vehicle speed and the accelerator operation amount. The hybrid ECU 12 also performs calculations that are necessary for various types of control, such as the regenerative braking and the like, based on the vehicle speed and the accelerator operation amount stored in the memory. The hybrid ECU 12 supplies to the battery ECU 14 and the engine ECU 15 data that are used for various types of control and receives necessary data from the battery ECU 14 and the engine ECU 15. In addition, the hybrid ECU 12 executes various types of control, such as the regenerative braking and the like, in coordination with the other ECUs. The hybrid ECU 12 controls the inverter 4 so as to control the operation of the motor 2 and the generator 3.

The battery ECU 14 detects a state of charge of the battery 5 and controls charging and discharging of the battery 5. For example, when the amount of the charge in the battery 5 exceeds a predetermined threshold value, the battery ECU 14 determines that the battery is fully charged. When the amount of the charge is below the predetermined threshold value, the battery ECU 14 determines that the battery is not fully charged. The battery ECU 14 determines whether or not to charge the battery 5 according to the state of charge of the battery 5. The engine ECU 15 controls the engine output by controlling the operation of the engine 1, that is, by controlling the engine revolution speed, the amount of fuel supplied, and the like.

When the brake pedal is depressed, a detection signal indicating an amount (hereinafter referred to as a brake operation amount) of operation performed to the brake pedal is transmitted from the brake operation amount sensor 16 to the brake ECU 11. A regenerative braking request is accordingly sent from the brake ECU 11 to the hybrid ECU 12.

In response to the regenerative braking request, the hybrid ECU 12 controls the inverter 4 and thereby generates electric power by letting the motor 2 be driven by the rotational force of the front wheels FL and FR connected with the reduction gear 7. The hybrid ECU 12 also controls the inverter 4 and thereby charges the battery 4 by means of the electric power generated in this manner.

In generating the electric power, the braking force is obtained from a resistance force of the motor 2. If the braking force at this time is less than the requested braking force that was calculated based on the brake operation amount, the brake ECU 11 operates the motor 2 and the various types of valves in the pressure adjustment portion 9 to adjust the braking force that the braking force generating portions 10FL to 10RR generate.

In contrast, when the accelerator pedal is depressed, a detection signal indicating the accelerator operation amount is transmitted from the accelerator operation amount sensor 18 to the hybrid ECU 12. The hybrid ECU 12 determines based on the accelerator operation amount whether the brake pedal is in a no-load operating range or a loaded operating range and performs a control based on the result of the determination.

Figure 3:
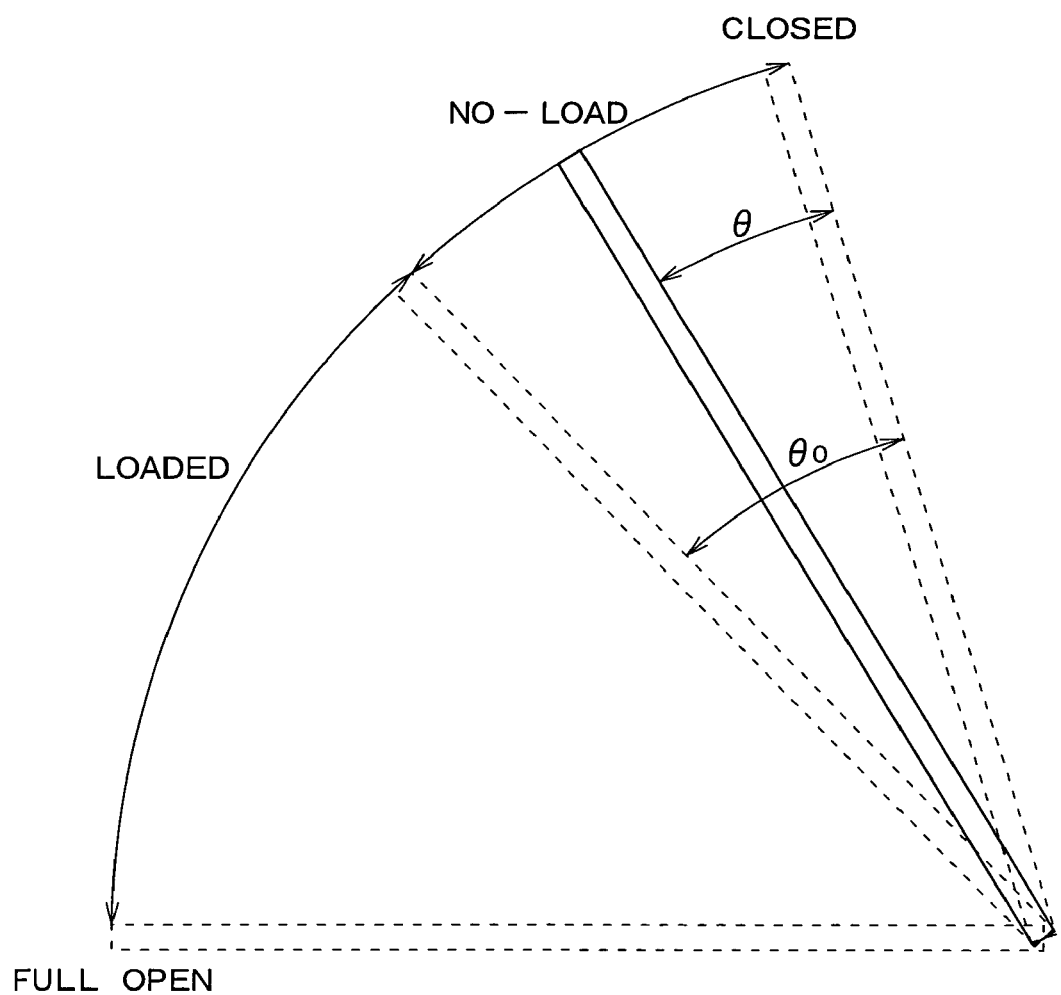
FIG. 3 is a schematic diagram showing relationships of an amount of operation of an accelerator pedal to a no-load operating range and a loaded operating range.

As shown in FIG. 3, when the accelerator pedal is in an range between a state where it is completely closed and a state where it is depressed to an angle $\theta_0$, that is, when the accelerator angle $\theta$ (which indicates an output level of the accelerator) is less than $\theta_0$, the hybrid ECU 12 determines the accelerator pedal is in the no-load operating range in which the output of the engine 1 should be at its minimum or the engine should be stopped.

When the accelerator pedal is in the no-load operating range and the engine 1 is operating, the hybrid ECU 12 puts the output of the engine 1 into a minimum output (or, idling) state, by reducing the engine revolution speed. The drive shaft revolution speed and decelerate the vehicle are accordingly reduced. Since the drive shaft and the engine 1 are not directly engaged at this time, engine braking effect is not generated, which would be generated by a resistance force of the engine 1 if the rotational speed of the engine were reduced. In order to compensate for the lack of the engine braking effect, an engine brake assist (EBA) control is performed which makes the brake system apply a decelerating force to the vehicle. The EBA control also achieves a decelerating force that is equivalent to the engine braking force when the engine 1 is not operating.

When the accelerator pedal is depressed beyond an accelerator angle of $\theta_0$, the accelerator pedal is determined to be in the loaded operating range.

In the loaded operating range, the hybrid ECU 12 increases the revolution speed of the drive shaft and accelerates the vehicle by causing the engine ECU 15 to increase the revolution speed of the engine 1 or by causing the inverter 4 to increase the output revolution speed of the motor 2.

Next, the EBA control that is executed in the no-load operating range will be explained. The EBA control is executed in a coordinated manner by various ECUs which constitute the control system of the vehicle deceleration control device. Specifically, the EBA control is executed as described below.

First, the hybrid ECU 12 and the brake ECU 11 detect vehicle state quantities. More specifically, the hybrid ECU 12 determines the accelerator operation amount and the vehicle speed based on the detection signals from the accelerator operation amount sensor 18 and the wheel speed sensor 17.

In addition, the brake ECU 11 determines the brake operation amount based on the detection signal from the brake operation amount sensor 16. When it is detected based on the determined brake operation amount that the brake pedal is being operated, priority is given to generating the braking force based on the brake pedal operation. When it is detected that the brake pedal is not being operated, the brake ECU 11 calculates the supplemental braking force. The method of calculating the supplemental braking force will be explained later in detail.

The battery ECU 14 detects the state of charge of the battery 5. Specifically, the battery ECU 14 determines whether or not the battery 5 is in a fully charged state (that is, a state in which the amount of charge exceeds a predetermined threshold value.) The determination is transmitted to the brake ECU 11 by way of the hybrid ECU 12.

When the battery ECU 14 transmits to the brake ECU 11 a determination that the battery is not in a fully charged state, the brake ECU 11 outputs the regenerative braking request to the hybrid ECU 12. Specifically, the brake ECU 11 transmits to the hybrid ECU 12 data indicating the supplemental braking force and requests regenerative braking which is sufficient for generating the supplemental braking force.

In response to the request, the hybrid ECU 12 controls the inverter 4 to activate regenerative braking. Specifically, the hybrid ECU 12 causes the motor 2 to function as a generator, such that the kinetic energy of the vehicle is collected as electric power, with which the battery 5 is charged.

In contrast, when the battery is in a fully charged state, the brake ECU 11 operates a motor that is provided in the pressure adjustment portion 9, and sets an appropriate path for transmitting brake hydraulic pressure by controlling various types of valves, so as to control the braking forces generated by the braking force generating portions 10FL, 10FR, 10RL and 10RR, thereby achieving the supplemental braking force.

Thus, in the no-load operating range, the braking operation can be executed to achieve the supplemental braking force by switching between using regenerative braking and using the brake system's hydraulic brakes according to whether or not the battery 5 is in a fully charged state.

Next, the specific method for setting the supplemental braking force will be explained with reference to a flowchart in FIG. 4. The processes in the flowchart are executed by the brake ECU 11 when it determines the supplemental braking force while the EBA control is in effect. That is, the processes are executed in every calculation cycle for the EBA control. Although the processes are executed by the brake ECU 11 in this embodiment, the processes may be executed in any part of the control system of the vehicle deceleration control device.

At step 100, the brake ECU 11 determines whether or not the accelerator pedal has switched from a state of being depressed (ON) to a state of not being depressed (OFF), that is, whether or not the accelerator operation from ON to OFF has been executed. Specifically, the brake ECU 11 obtains data indicating the accelerator operation amount that was determined by the hybrid ECU 12 based on the detection signal from the accelerator operation amount sensor 18. The brake ECU 11 then executes step 100 based on the obtained data. If the accelerator operation amount that was determined in the preceding calculation cycle corresponds to the loaded operating range and the accelerator operation amount that is determined in the current calculation cycle corresponds to the no-load operating range, the determination at 100 becomes affirmative (YES). Otherwise, the determination becomes negative (NO). If the determination at 100 is affirmative, the processing proceeds to 110. If the determination at 100 is negative, the current calculation cycle ends.

At steps 110 and 120, the brake ECU 11 determines the accelerator operation state in returning the accelerator pedal. Specifically, the initial accelerator angle ($\theta$) is determined at step 110 and the accelerator return speed ($\Delta\theta$) is determined at step 120.

The initial accelerator angle is the accelerator angle at the time instant when the accelerator pedal starts returning. The initial accelerator angle is determined based on time variation of the accelerator operation amount that is stored in the hybrid ECU 12. The accelerator return speed is determined by taking the difference between the initial accelerator angle and the accelerator angle corresponding to the accelerator operation amount determined in the current calculation cycle, and by dividing the difference by the time interval between the current calculation cycle and the calculation cycle when the accelerator operation amount that corresponds to the initial accelerator angle was stored in the hybrid ECU 12.

When the initial accelerator angle and the accelerator return speed are determined, the processing proceeds to step 130, where a braking force is calculated so that is becomes and engine braking-equivalent braking force which compensates for the lack of the engine braking force corresponding to the accelerator operation state in returning the accelerator pedal. Here, the engine braking-equivalent braking force is determined using the map in FIG. 5, which shows a correlation of the engine braking-equivalent braking force to the initial accelerator angle and the accelerator return speed.

A driver's braking intention is apparent in the accelerator operation state in returning the accelerator pedal. Therefore, if the engine braking-equivalent braking force is determined according to the accelerator operation state in returning the accelerator pedal, the engine braking-equivalent braking force reflects the driver's braking intention. Specifically, the larger the initial accelerator angle becomes or the larger the accelerator return speed becomes, the greater the driver's braking intention is considered to be.

Figure 5:
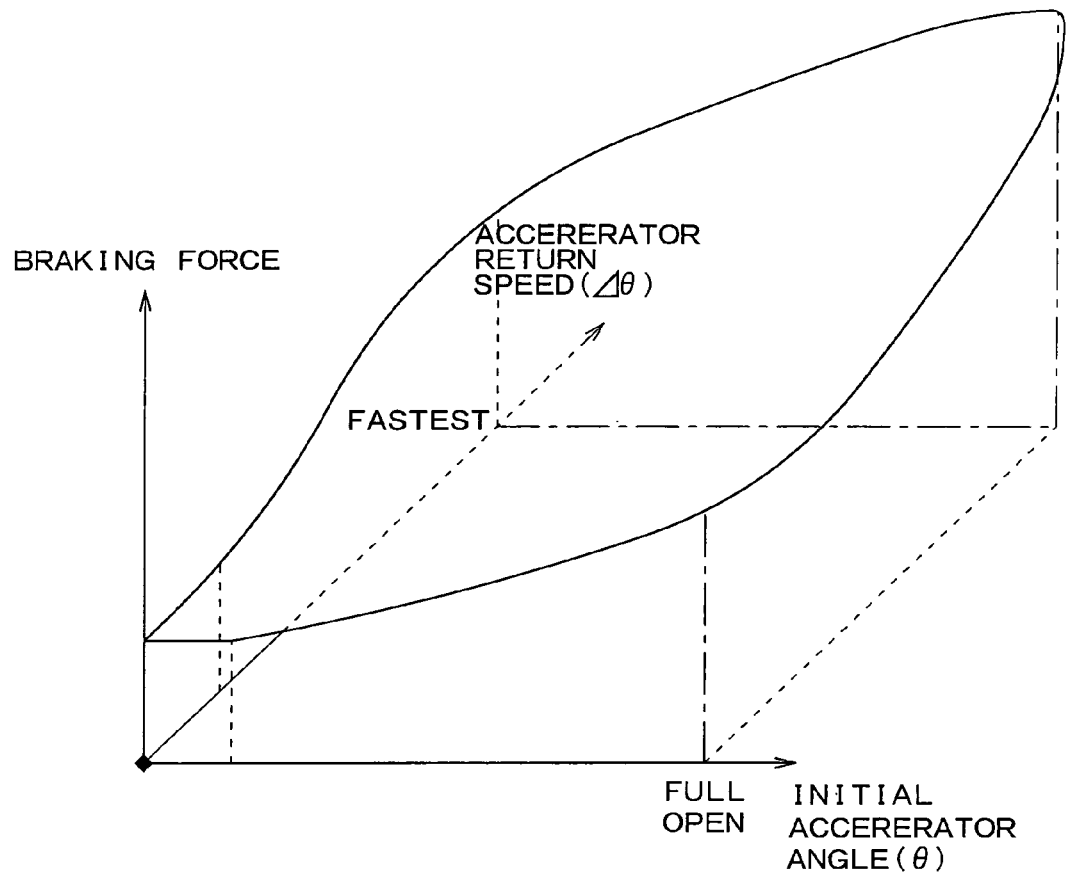
FIG. 5 is a map showing a correlation of the engine braking-equivalent braking force to an initial accelerator angle and an accelerator return speed.

Therefore, as shown in FIG. 5, the engine braking-equivalent braking force changes according to the initial accelerator angle and according to the accelerator return speed. More specifically, the larger the initial accelerator angle becomes or the larger the accelerator return speed becomes, the greater becomes the value of the engine braking-equivalent braking force. It is therefore possible to determine an appropriate supplemental braking force that reflects the driver's braking intention.

When the engine braking-equivalent braking force is determined in this manner, the brake ECU 11 achieves the supplemental braking force by transmitting, via the hybrid ECU 12 or the like, appropriate output signals to the motor 2, the inverter 4, the pressure generating portion 8, the pressure adjustment portion 9, and the braking force generating portions 10FL, 10FR, 10RL, and 10RR, which serve as a deceleration supplementing means.

In this embodiment, as explained above, it is possible to determine the supplemental braking force that corresponds to the accelerator operation state. Therefore, it is possible to determine an appropriate supplemental braking force that reflects the driver's braking intention, making it possible to improve the regenerative braking feeling that is imparted to the driver.

Second Embodiment

A second embodiment of the present invention will be explained below. In this embodiment, an engine braking-equivalent braking force is determined by a different method from that used in the first embodiment. Since the basic structure and the like of a vehicle deceleration control device in this embodiment are almost the same as in the first embodiment, only the parts that differ will be explained.

Figure 6:
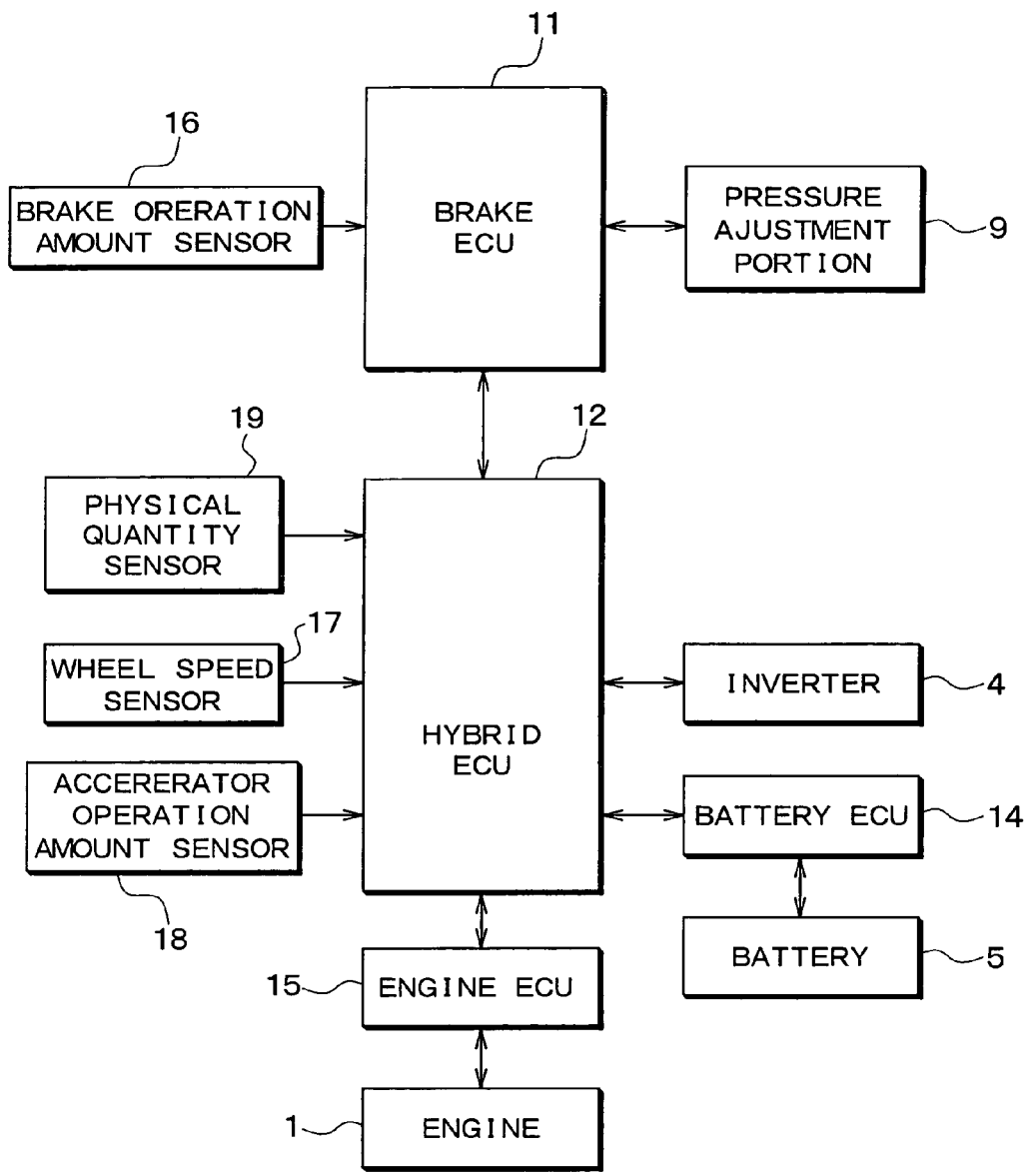
FIG. 6 is a block diagram of a control system for a vehicle deceleration control device according to a second embodiment of the present invention.

As shown in FIG. 6, the control system for a vehicle deceleration control device according to this embodiment includes a physical quantity sensor 19, which detects a physical quantity indicating a state (hereinafter referred to the vehicle behavior state) of vehicle's behavior. A detection signal from the physical quantity sensor 19 is inputted to the hybrid ECU 12 such that the hybrid ECU 12 can detect the vehicle behavior state.

For example, a yaw rate sensor, a wheel speed sensor, a steering angle sensor, or the like may be used as the physical quantity sensor 19. The yaw rate sensor outputs a detection signal indicating yaw of the vehicle, so a yaw rate can be determined based on the detection signal. The wheel speed sensor outputs a detection signal indicating a revolution speed of any wheel FL to RR, so based on the signal, the revolution speed of any wheel FL to RR can be calculated, or the vehicle speed can be calculated. The coefficient of friction μ of the road surface can also be calculated based on changes in the revolution speed or the like. The steering angle sensor outputs a detection signal indicating a steering angle, so the steering angle can be determined based on the detection signal. Based on the steering angle and the vehicle speed, it is possible, for example, to determine the lateral acceleration that bears on the vehicle while the vehicle is turning at high speed.

Figure 7:
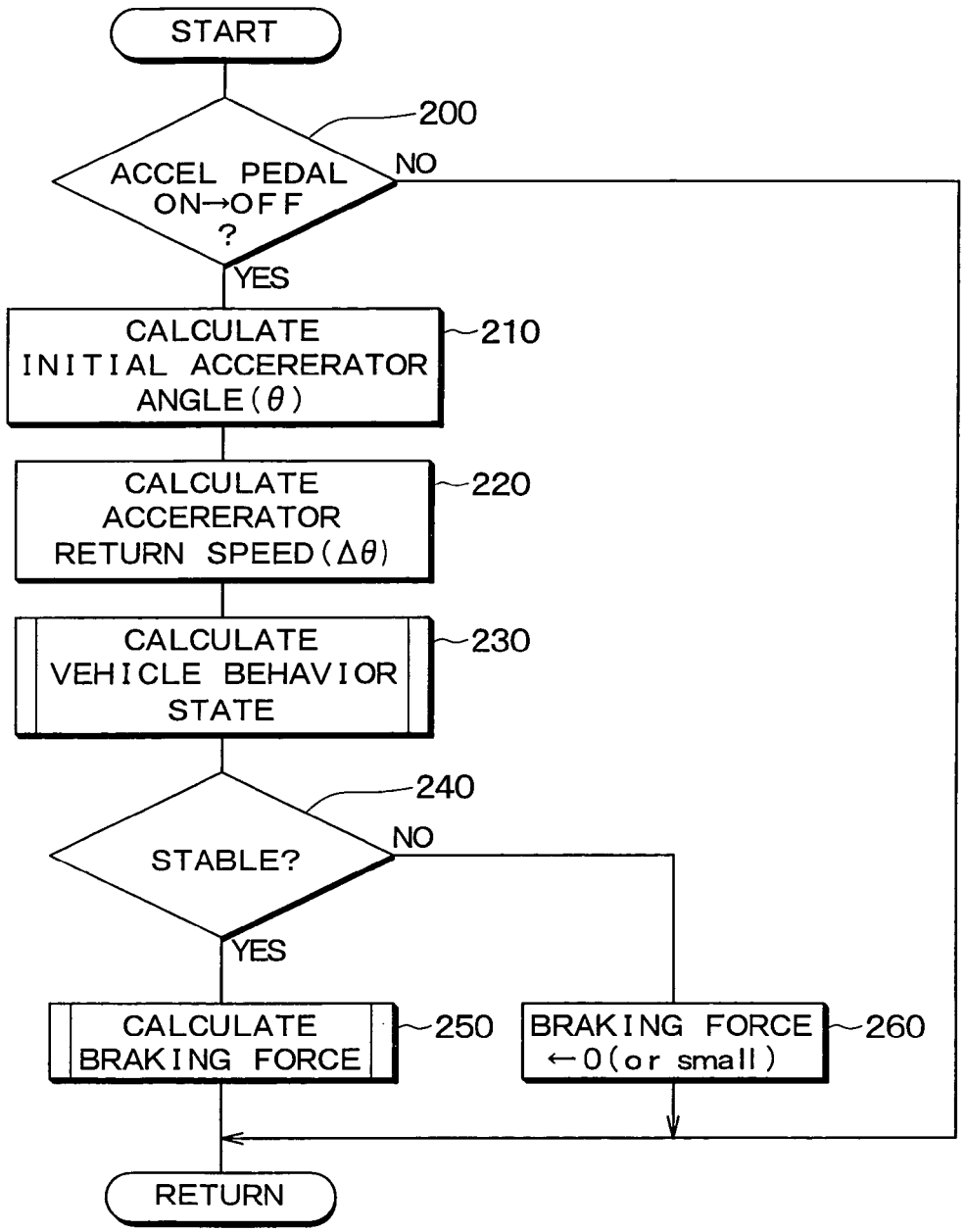
FIG. 7 is a flowchart of processes that the control system shown in FIG. 6 executes to calculate the engine braking-equivalent braking force.

Next, a specific method that the control system of the vehicle deceleration control device uses to set a supplemental braking force will be explained with reference to a flowchart in FIG. 7. The processes in the flowchart are executed in every calculation cycle for the EBA control.

Figure 4:
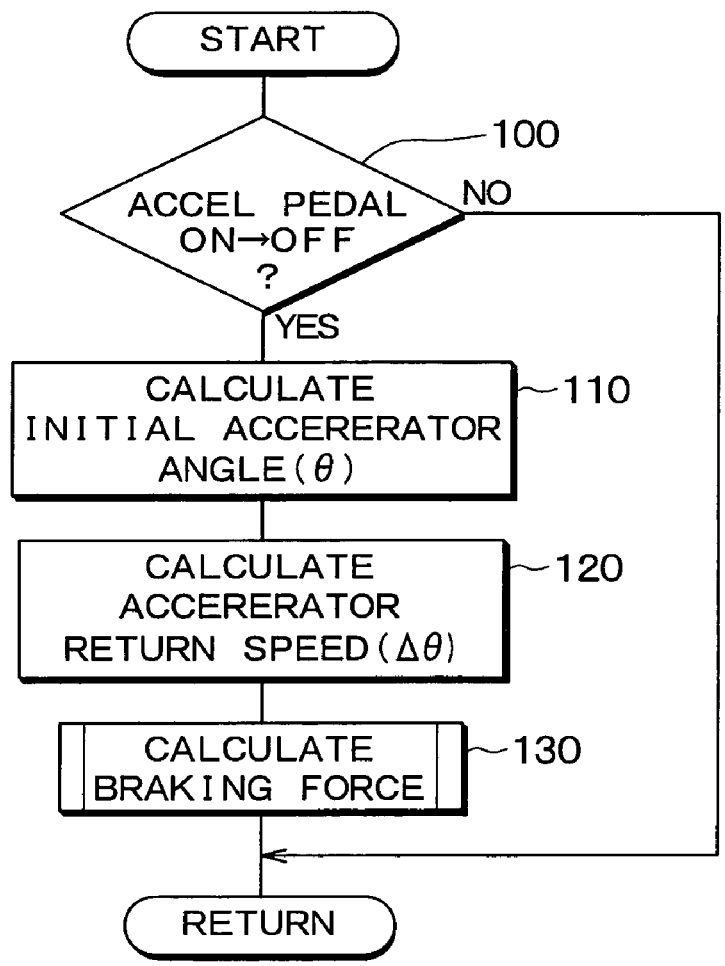
FIG. 4 is a flowchart of processes that the control system shown in FIG. 2 executes to calculate an engine braking-equivalent braking force that is equivalent to a supplemental braking force.

First, in the processes at steps 200 to 220, the same processes are executed as those of steps 100 to 120 in FIG. 4. At step 230, the vehicle behavior state is calculated. In other words, the vehicle behavior state is determined based on the detection signal from the physical quantity sensor 19. For example, the lateral acceleration that bears on the vehicle or the coefficient of friction μ of a surface of a road may be determined based on the yaw rate and the vehicle speed or on the steering angle and the vehicle speed.

Subsequently at step 240, a determination is made as to whether or not the vehicle behavior state indicates a stable state. For example, in a situation where the lateral acceleration exceeds a predetermined threshold value, such that side slip can occur, the processing determines that the vehicle behavior state is an unstable state. In such a situation, the smaller the road surface coefficient of friction μ becomes, the more readily the vehicle behavior state becomes unstable. Therefore, the stability of the vehicle behavior state can be determined more accurately if the threshold value for determining whether or not the vehicle behavior state is a stable state is varied according to the magnitude of the friction coefficient μ of the road surface.

If the determination at step 240 is affirmative, step 250 is subsequently executed. At step 250, the engine braking-equivalent braking force is calculated in the same way as step 130 in FIG. 4. On the other hand, if the determination at step 240 is negative, the engine braking-equivalent braking force is subsequently set to zero at step 260. There would be a possibility that the vehicle behavior state becomes more unstable if a braking force equivalent to the engine braking force were generated when the vehicle behavior state is an unstable state. For that reason, it is prohibited in such a case to generate the engine braking-equivalent braking force. It is therefore possible to suppress destabilization of the vehicle behavior state.

Although the engine braking-equivalent braking force may be set, as described above, to zero, it may be set to any value that does not promote destabilization of the vehicle behavior state. The engine braking-equivalent braking force may also be set to a value that is less than a normal value which would be calculated as the engine braking-equivalent braking force when the vehicle behavior state were stable. In this case, the engine braking-equivalent braking force may be set to a value that is determined by multiplying the normal value calculated at step 250 by a predetermined coefficient which is less than unity. Otherwise, a map of the same sort as that shown in FIG. 5 may be prepared for use when the vehicle behavior state is unstable, and the engine braking-equivalent braking force may be determined based on the map. These methods make it possible to vary the value of the engine braking-equivalent braking force according to the degree of instability. More specifically, the higher the degree of instability becomes, the lower becomes the value that can be set for the engine braking-equivalent braking force.

In this embodiment, as explained above, the value of the engine braking-equivalent braking force is varied according to whether or not the vehicle behavior state is unstable, or according to the degree of instability. Therefore, it is possible to inhibit destabilization of the vehicle behavior state while still taking the driver's braking intention into account.

Third Embodiment

A third embodiment of the present invention will be explained. In this embodiment, an engine braking-equivalent braking force is determined by a different method from that used in the first embodiment. The basic structure and the like of a vehicle deceleration control device in this embodiment are the same as those in the first embodiment. Only the processes executed by the control system of the vehicle deceleration control device to calculate an engine braking-equivalent braking force are different, so only the part that differs will be explained.

Figure 8:
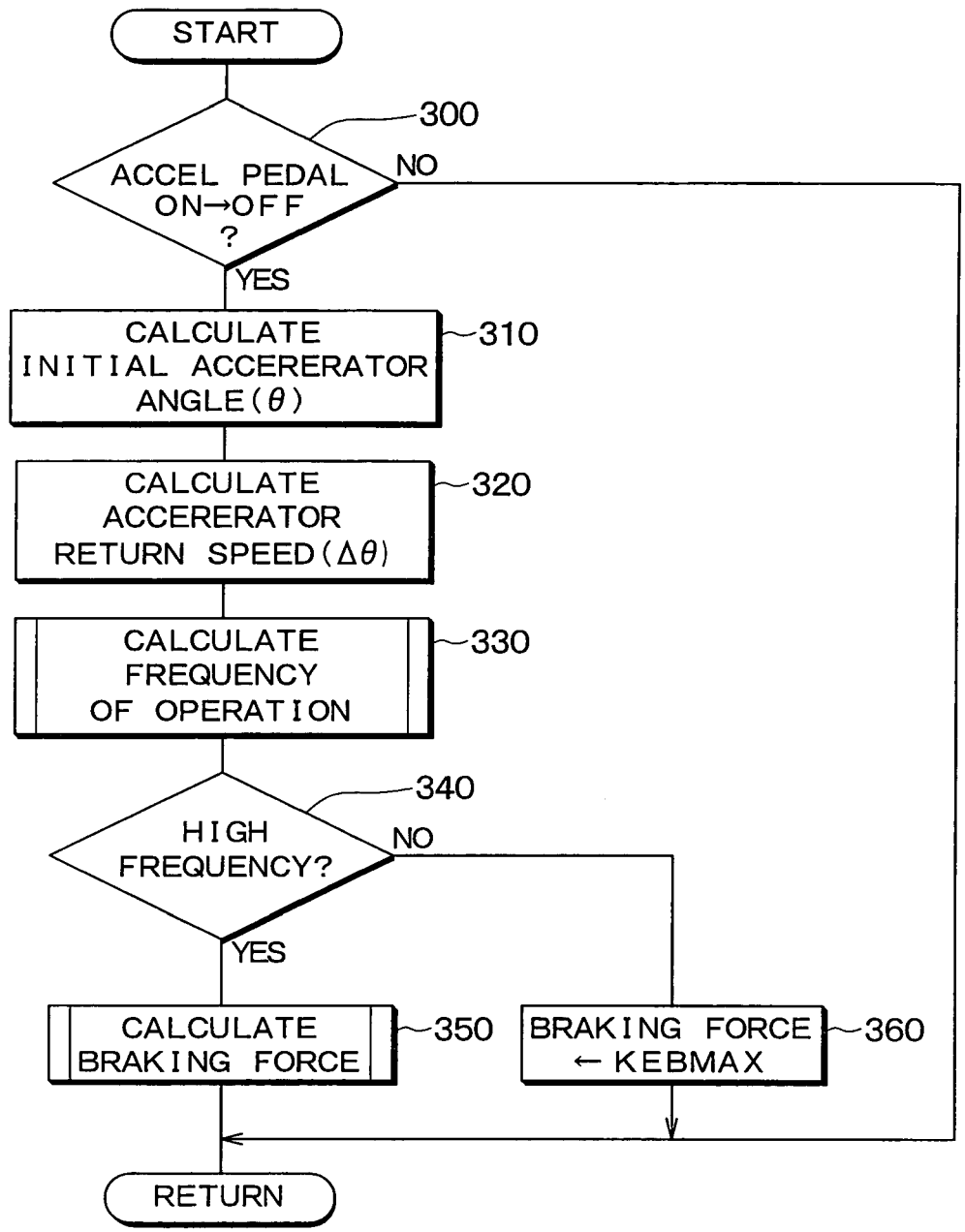
FIG. 8 is a flowchart of processes that a control system for a vehicle deceleration control device according to a third embodiment of the present invention executes to calculate the engine braking-equivalent braking force.

Processes in a flowchart shown in FIG. 8 are executed by the control system of the vehicle deceleration control device in every calculation cycle for the EBA control.

First, in the processes at steps 300 to 320, the same processes are executed as those at steps 100 to 120 in FIG. 4. Subsequently at step 330, frequency of the accelerator operation is calculated. For example, the frequency of the accelerator operation is calculated by determining the number of times for which the accelerator pedal has been operated, based on the accelerator operation amount stored in the hybrid ECU 12. Specifically, the frequency of accelerator operation is calculated based on the number of times (per unit time or per unit travel distance) for which the accelerator has changed from an ON state to an OFF state. A travel distance of the vehicle can be determined by multiplying the vehicle speed by the elapsed time.

Subsequently at step 340, a determination is made as to whether or not the frequency of accelerator operation that was determined at 330 is high. For example, if the frequency of accelerator operation exceeds 3 times per minute or 5 times per kilometer, it is determined that the frequency of accelerator operation is high.

If the determination at step 340 is negative, step 350 is subsequently executed. At step 350, the engine braking-equivalent braking force is calculated in the same manner as that used in the first embodiment at 130 in FIG. 4. On the other hand, if the determination at step 340 is affirmative, step 360 is subsequently executed where the engine braking-equivalent braking force is set to a maximum value (KEBMAX). When the frequency of accelerator operation is high, it is likely that the driver's braking intention is strong, in other words, the driver likely wants to accelerate and decelerate quickly. Therefore, in this case, the engine braking-equivalent braking force is set to a high value so that deceleration will be executed with quick response.

The maximum value for the engine braking-equivalent braking force may be a value at which a fixed rate of deceleration is achieved, or it may be a value that is greater than a normal value which would be calculated as the engine braking-equivalent braking force when the frequency of accelerator operation were not high. In that case, the engine braking-equivalent braking force may be set to a value that is the determined by multiplying the normal value calculated at step 350 by a predetermined coefficient (for example, 2) which is larger than unity.

Otherwise, a map of the same sort as that shown in FIG. 5 may be prepared for use when the frequency of accelerator operation is high, and the engine braking-equivalent braking force may be determined based on the map. These methods make it possible to vary the value of the engine braking-equivalent braking force according to the frequency of the accelerator operation. More specifically, the higher the frequency of the accelerator operation becomes, the greater becomes the value that can be set for the engine braking-equivalent braking force.

In this embodiment, as explained above, the value of the engine braking-equivalent braking force is varied according to the frequency of the accelerator operation. Therefore, it is possible to better take the driver's braking intention into account.

Other Embodiments

The present invention should not be limited to the embodiment discussed above and shown in the figures, but may be implemented in various ways without departing from the spirit of the invention.

In the embodiments explained above, the accelerator operation amount and the accelerator return speed in returning the accelerator pedal is used as the accelerator operation state. They are determined based on the amount of operation performed to the accelerator pedal. However, the accelerator operation state in returning the accelerator pedal may be expressed in terms of a degree of opening of a throttle (e.g., a valve that directly regulates the amount of fuel entering the engine) of the vehicle, the amount of change of the degree of the opening of the throttle, or the like, instead of the amount of operation performed to the accelerator pedal.

In the embodiments explained above, the supplemental braking force is determined based on both the accelerator operation amount in returning the accelerator pedal and the accelerator return speed. However, the supplemental braking force may be determined based on only the accelerator operation amount or only the accelerator return speed.

Note that the numbered elements shown in the flowcharts correspond to portions that execute various types of processes. For example, the portion that executes the processes at steps 100 to 120 in FIG. 4, at steps 200 to 220 in FIG. 7, and at step 300 to 320 in FIG. 8 is an example of a first detection portion. The portion that executes the processes at steps 130, 250, and 350 is an example of a setting portion. The portion that executes the processes at step 230 is an example of a second detection portion. The portion that executes the processes at step 330 is an example of a third detection portion.

The vehicle deceleration control device employs different units for the deceleration supplementing means to achieve the supplemental braking force, depending on whether or not the battery 5 is in a fully charged state. However, each of the units (in other words, each of a combination of the motor 2 and the inverter 4, and a combination of the brake hydraulic pressure generating portion 8, the brake hydraulic pressure adjustment portion 9, and the braking force generating portions 10FL, 10FR, 10RL, 10RR) is also an example of the deceleration supplementing means.

Although it is not shown in the drawings described above, a portion is an example of a deceleration generation control means if the portion transmits output signals to an example of the deceleration supplementing means (for example, the motor 2, the inverter 4, the brake hydraulic pressure generating portion 8, the brake hydraulic pressure adjustment portion 9, and the braking force generating portions 10FL, 10FR, 10RL, 10RR) when the engine braking-equivalent braking force is determined.

What is claimed is:

1. A vehicle deceleration control device, comprising:
    a first detection portion for detecting a state of operation when a driver returns an accelerator pedal from a loaded operation range to a no-load operation range, wherein the accelerator pedal is in the no-load operating range when the engine is stopped or when the engine output is at a minimum, and the accelerator pedal is in the loaded operating range when the accelerator is operated to accelerate the vehicle;
    a setting portion for setting a braking force to a level equivalent to an engine braking force that is based on the detected state of the operation of the accelerator; and
    a control portion for generating, by using a deceleration supplementing portion, the braking force set by the setting portion for compensating for a lack of engine braking effect.

2. The vehicle deceleration control device according to claim 1, wherein,
    the first detection portion detects an output level of the accelerator at a time instant when the accelerator starts returning toward the no-load operation range as the state of the operation; and
    the setting portion sets the braking force to a stronger force as the detected output level becomes greater.

3. The vehicle deceleration control device according to claim 1, wherein,
    the first detection portion determines a return speed of the accelerator as the state of the operation; and
    the setting portion sets the braking force to a stronger force as the return speed becomes greater.

4. The vehicle deceleration control device according to claim 1, further comprising a second detection portion for detecting a state of behavior of the vehicle, wherein the setting portion varies strength of the braking force based on the state of the behavior detected by the second detection portion.

5. The vehicle deceleration control device according to claim 4, wherein the setting portion sets, based on a determination that the detected state of the behavior indicates an unstable state, the braking force to a force weaker than when the state of the behavior indicates a stable state.

6. The vehicle deceleration control device according to claim 4, wherein the setting portion sets the braking force to zero, based on a determination that the detected state of the behavior state indicates an unstable state.

7. The vehicle deceleration control device according to claim 5, wherein the second detection portion determines a lateral acceleration of the vehicle and determines based on the determined lateral acceleration whether the vehicle behavior state is stable or unstable.

8. The vehicle deceleration control device according to claim 4, wherein,
the second detection portion determines a friction coefficient of a surface of a road, and
the setting portion varies strength of the braking force based on the determined friction coefficient.

9. The vehicle deceleration control device according to claim 8, wherein the setting portion sets, based on a determination that the friction coefficient is less than a predetermined value, the braking force to a force weaker than when the detected friction coefficient is greater than the predetermined value.

10. The vehicle deceleration control device according to claim 1, further comprising:
a second detection portion for detecting a frequency of operation of the accelerator pedal;
wherein the setting portion sets the braking force to a stronger force as the detected frequency becomes greater.

* * * * *